US009934380B2

(12) United States Patent
Dalcher et al.

(10) Patent No.: US 9,934,380 B2
(45) Date of Patent: Apr. 3, 2018

(54) EXECUTION PROFILING DETECTION OF MALICIOUS OBJECTS

(71) Applicant: McAfee, Inc., Santa Clara, CA (US)

(72) Inventors: Greg W. Dalcher, Tigard, OR (US); Koichi Yamada, Los Gatos, CA (US); Palanivel Rajan Shanmugavelayutham, San Jose, CA (US); Jitendra P. Singh, Santa Clara, CA (US)

(73) Assignee: McAfee, LLC, Plano, TX (US)

( * ) Notice: Subject to any disclaimer, the term of this patent is extended or adjusted under 35 U.S.C. 154(b) by 22 days.

(21) Appl. No.: 14/582,163

(22) Filed: Dec. 23, 2014

(65) Prior Publication Data

US 2016/0180090 A1    Jun. 23, 2016

(51) Int. Cl.
| | | |
|---|---|---|
| *G06F 12/14* | (2006.01) | |
| *G06F 21/56* | (2013.01) | |
| *G06F 21/55* | (2013.01) | |
| *G06F 21/53* | (2013.01) | |
| *G06F 21/54* | (2013.01) | |
| *G06F 21/57* | (2013.01) | |

(52) U.S. Cl.
CPC ............ *G06F 21/566* (2013.01); *G06F 21/53* (2013.01); *G06F 21/54* (2013.01); *G06F 21/554* (2013.01); *G06F 21/57* (2013.01); *G06F 2221/033* (2013.01)

(58) Field of Classification Search
CPC ........ G06F 21/566; G06F 21/55; G06F 21/56; G06F 21/554; G06F 2221/033
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,347,375 B1 * | 2/2002 | Reinert | G06F 21/564 |
| | | | 726/24 |
| 6,460,050 B1 | 10/2002 | Pace et al. | |
| 7,506,155 B1 | 3/2009 | Stewart et al. | |
| 7,814,544 B1 * | 10/2010 | Wilhelm | G06F 21/566 |
| | | | 719/328 |
| 8,234,640 B1 * | 7/2012 | Fitzgerald | G06F 21/53 |
| | | | 718/1 |

(Continued)

OTHER PUBLICATIONS

N. Asokan et al., "Mobile Trusted Computing", In: proceedings of the IEEE, vol. 12, No. 8, Aug. 2014, pp. 1189-1206.

(Continued)

*Primary Examiner* — Khoi Le
(74) *Attorney, Agent, or Firm* — Patent Capital Group

(57) ABSTRACT

In an example, there is provided a system and method for execution profiling detection of malicious software objects. An execution profiling (EXP) engine may be provided in conjunction with a binary translation engine (BTE). Both may operate within a trusted execution environment (TEE). Because many malware objects make assumptions about memory usage of host applications, they may cause exceptions when those assumptions prove untrue. The EXP engine may proactively detect such exceptions via the BTE when the BTE performs its translation function. Thus, malicious behavior may be detected before a binary runs on a system, and remedial measures may be provided.

25 Claims, 4 Drawing Sheets

(56) References Cited

U.S. PATENT DOCUMENTS

| | | | |
|---|---|---|---|
| 8,302,192 B1* | 10/2012 | Cnudde | H04L 63/145 726/22 |
| 8,713,631 B1 | 4/2014 | Pavlyushchik | |
| 8,850,579 B1* | 9/2014 | Kalinichenko | G06F 21/53 726/22 |
| 2006/0294508 A1 | 12/2006 | Berkowits et al. | |
| 2007/0192863 A1* | 8/2007 | Kapoor | G06F 9/505 726/23 |
| 2007/0289019 A1* | 12/2007 | Lowrey | G06F 21/554 726/24 |
| 2009/0150419 A1 | 6/2009 | Kim et al. | |
| 2010/0223451 A1* | 9/2010 | Hitaka | G06F 9/4411 713/2 |
| 2012/0198553 A1* | 8/2012 | Suginaka | G06F 21/55 726/24 |
| 2013/0145472 A1* | 6/2013 | Ramabhatta | G06F 21/566 726/25 |
| 2013/0152200 A1* | 6/2013 | Alme | H04L 63/145 726/24 |
| 2013/0227680 A1 | 8/2013 | Pavlyushchik | |
| 2014/0245446 A1* | 8/2014 | Shanmugavelayutham | G06F 21/566 726/24 |

OTHER PUBLICATIONS

PCT International Search Report and Written Opinion in International Application No. PCT/US2015/062844 dated Apr. 18, 2016.
International Preliminary Report on Patentability issued in International Application No. PCT/US2015/062844 on Jun. 27, 2017.

\* cited by examiner

EXECUTION PROFILING DETECTION OF MALICIOUS OBJECTS

FIELD OF THE DISCLOSURE

This application relates to the field of computer security, and more particularly to a system and method for execution profiling detection of malicious objects.

BACKGROUND

Malicious and other unwanted objects may include both executable objects, which themselves contain executable code, and malicious static objects that are intended to be loaded by a parent process and then to infect the parent process. In one example, a malicious object exploits a security flaw found in a specific version of a software package. for example, a specific version may include a flaw that permits a stack corruption exploit in which a malicious object overwrites a return address of a subroutine call with the address of a malware routine. When the subroutine pops the return address from its stack and issues a "RETURN" instruction, control is passed to the malware routine.

Such exploits rely on flaws that may be found only in very specific versions of a package, and must assume that exact version number (or at least a version with the exact flaw). If the malware object tries to execute in conjunction with a version in which the flaw has been patched, a software exception may occur. Malware often makes use of undocumented internal structures to exploit vulnerabilities in software. As a result, malware may also trigger exceptions due to incorrect assumptions about internal layout of data structures. The exception may simply cause the program to crash, in which case the user may simply think the file is corrupted, and never detect the malicious intent of the object.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Overview

Figure 1:
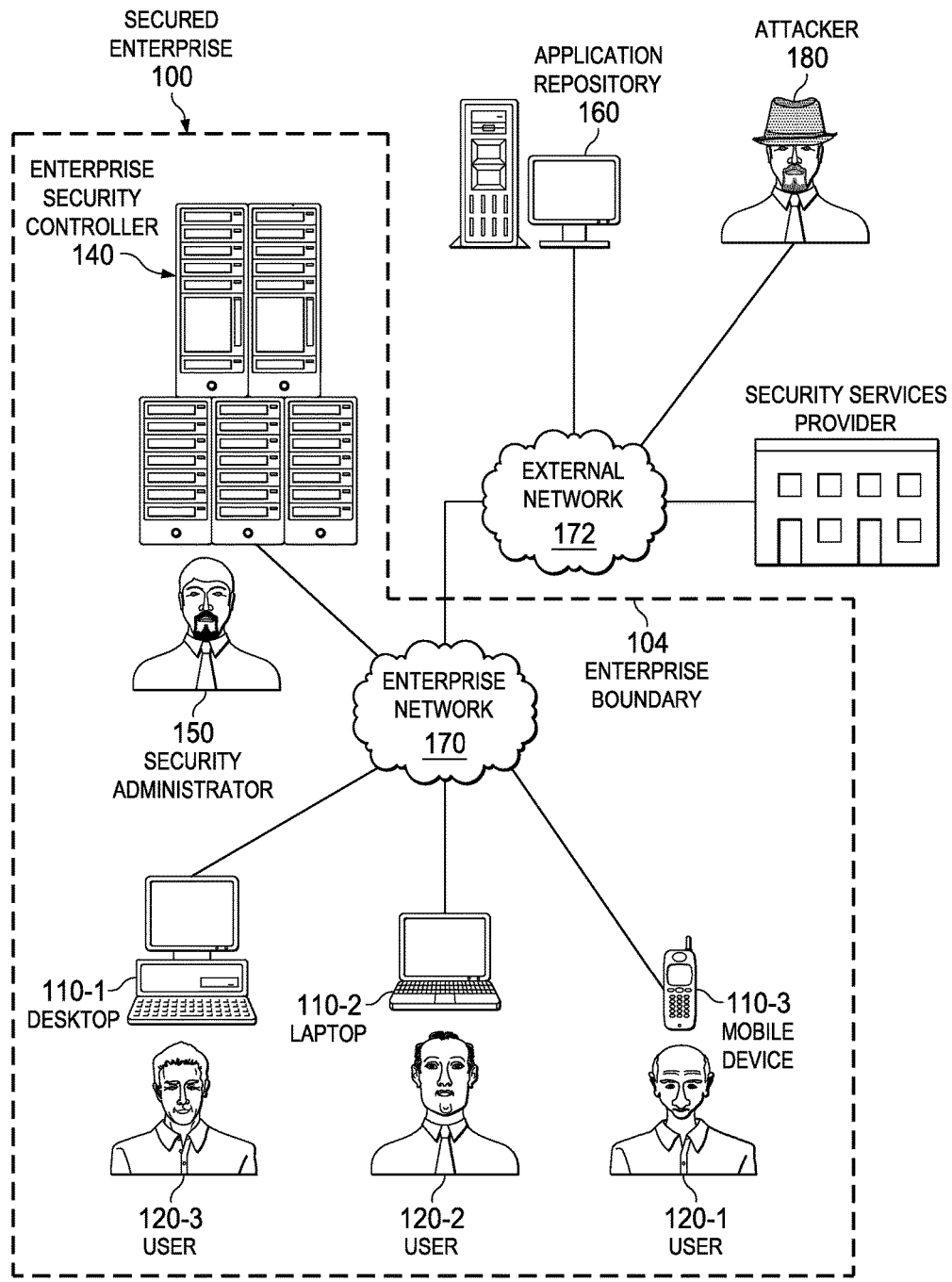
FIG. 1 is a block diagram of a security-enabled network according to one or more examples of the present Specification.

In an example, there is provided a system and method for execution profiling detection of malicious software objects. An execution profiling (EXP) engine may be provided in conjunction with a binary translation engine (BTE). Both may operate within a trusted execution environment (TEE). Because many malware objects make assumptions about memory usage of host applications, they may cause exceptions when those assumptions prove untrue. The EXP engine may proactively detect such exceptions via the BTE when the BTE performs its translation function. Thus, malicious behavior may be detected before a binary runs on a system, and remedial measures may be provided.

Example Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Different embodiments many have different advantages, and no particular advantage is necessarily required of any embodiment.

In one example, a system and method of the present specification utilizes exception monitoring based on execution profiling (EXP) and binary translation (BT) to capture malicious activity and attempted malicious activity. The system and method of the present specification are thus able to analyze a candidate malicious object and determine, with reasonable confidence, whether it is an actual malicious objects, or a benign object.

This is possible because malware often makes assumptions about memory layout and then attempts exploit those assumptions to launch a malware payload. If those assumptions are not correct (for example, if a software version has changed slightly so that the assumption is no longer valid), an error may occur, generating an exception when the access is disallowed. In one example, a malware object includes a "BRANCH" instruction that attempts to write to or read from memory based on prior assumptions, or attempts a "BRANCH" instruction resulting from overwritten pointers and buffer overflows. When these are unsuccessful, in addition to access violation exceptions, these attempts may also generate other exceptions such as instruction invalidity.

An execution profiling engine may collect these exceptions while the process is executed by using BT. When exceptions are found, the object may be analyzed for indications of malicious activity. For example, analyzing the source of an invalid branch attempt may show that the branch did not originate in a legitimate manner or location.

EXP-based exception monitoring may also be combined with EXP-based monitoring of control transfers to specified address ranges for additional information useful for classification of software as either malicious or benign.

Furthermore, an initial access attempt that triggers an exception may be analyzed using BT-EXP monitoring of execution transfers to or from specified address ranges. For example, a malware objects assumption of memory layout may be reused between samples. Thus, addresses in the form 0x0C0C0Cnn may be observed (where "nn" and is the last byte range). Monitoring a range from 0x0C0C0C00 to 0x0C0C0C0FF may be used to analyze execution transfers to and from this range. The code initiating or receiving the transfers may then be analyzed for legitimacy.

EXP built on BT technology in one example may dynamically monitor an address that a program executes, including where it goes and where it comes from, and may also detect exception conditions before executing the instruction. Thus, a joint BT-EXP engine may monitor and reliably detect a malware object's attempts to access certain address ranges, including ones that are inaccessible, generating exceptions when the access is disallowed. Advantageously, this occurs without introducing execution flow changes in the monitored process, which may occur with other methods of monitoring, such as registered exception handlers.

Notably, using hooks in the execution dispatch APIs to monitor exception dispatching isn't always reliable for catching all exception conditions. Further, monitoring at this point will not provide information on the instruction pointer that a control transfer was from (the "from IP") in the case of the exception being due to a control transfer, which is often what is of interest for classification of software as malicious. Combining this analysis with control transfer monitoring using BT-EXP provides additional classification capabilities.

A system and method of execution profiling detection will now be described with more particular reference to the appended FIGURES. Throughout the FIGURES, common numerals are used to specify common elements across multiple FIGURES. However, this is not intended to imply a necessary or strict relationship between different embodiments disclosed herein. In some cases, one or more different examples or species of the same elements may be referred to in a hyphenated form. Thus, for example, the numerals 1xx-1 and 1xx-2 may refer to two different species or examples of a class of objects referred to as 1xx.

FIG. 1 is a network-level diagram of a secured enterprise 100 according to one or more examples of the present Specification. In the example of FIG. 1, a plurality of users 120 operate a plurality of client devices 110. Specifically, user 120-1 operates desktop computer 110-1. User 120-2 operates laptop computer 110-2. And user 120-3 operates mobile device 110-3.

Each computing device may include an appropriate operating system, such as Microsoft Windows, Linux, Android, Mac OSX, Apple iOS, Unix, or similar. Some of the foregoing may be more often used on one type of device than another. For example, desktop computer 110-1, which in one embodiment may be an engineering workstation, may be more likely to use one of Microsoft Windows, Linux, Unix, or Mac OSX. Laptop computer 110-2, which is usually a portable off-the-shelf device with fewer customization options, may be more likely to run Microsoft Windows or Mac OSX. Mobile device 110-3 may be more likely to run Android or iOS. However, these examples are not intended to be limiting.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices. In this illustration, enterprise network 170 is shown as a single network for simplicity, but in some embodiments, enterprise network 170 may include a large number of networks, such as one or more enterprise intranets connected to the internet. Enterprise network 170 may also provide access to an external network, such as the Internet, via external network 172. External network 172 may similarly be any suitable type of network.

One or more computing devices configured as an enterprise security controller (ESC) 140 may also operate on enterprise network 170. ESC 140 may provide a user interface for an awesome security administrator 150 to define enterprise security policies, which ESC 140 may enforce on enterprise network 170 and across client devices 120.

Secured enterprise 100 may encounter a variety of "security objects" on the network. A security object may be any object that operates on or interacts with enterprise network 170 and that has actual or potential security implications. In one example, object may be broadly divided into hardware objects, including any physical device that communicates with or operates via the network, and software objects. Software objects may be further subdivided as "executable objects" and "static objects." Executable objects include any object that can actively execute code or operate autonomously, such as applications, drivers, programs, executables, libraries, processes, runtimes, scripts, macros, binaries, interpreters, interpreted language files, configuration files with inline code, embedded code, and firmware instructions by way of non-limiting example. A static object may be broadly designated as any object that is not an executable object or that cannot execute, such as documents, pictures, music files, text files, configuration files without inline code, videos, and drawings by way of non-limiting example. In some cases, hybrid software objects may also be provided, such as for example a word processing document with built-in macros or an animation with inline code. For security purposes, these may be considered as a separate class of software object, or may simply be treated as executable objects.

Enterprise security policies may include authentication policies, network usage policies, network resource quotas, antivirus policies, and restrictions on executable objects on client devices 110 by way of non-limiting example. Various network servers may provide substantive services such as routing, networking, enterprise data services, and enterprise applications.

Secure enterprise 100 may communicate across enterprise boundary 104 with external network 172. Enterprise boundary 104 may represent a physical, logical, or other boundary. External network 172 may include, for example, websites, servers, network protocols, and other network-based services. In one example, an application repository 160 is available via external network 172, and an attacker 180 (or other similar malicious or negligent actor) also connects to external network 172.

It may be a goal of users 120 and secure enterprise 100 to successfully operate client devices 110 without interference from attacker 180 or from unwanted security objects. In one example, attacker 180 is a malware author whose goal or purpose is to cause malicious harm or mischief. The malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110. As used throughout this Specification, malicious software ("malware") includes any security object configured to provide unwanted results or do unwanted work. In many cases, malware objects will be executable objects, including by way of non-limiting examples, viruses, trojans, zombies, rootkits, backdoors, worms, spyware, adware, ransomware, dialers, payloads, malicious browser helper objects, tracking cookies, loggers, or similar objects designed to take a potentially-unwanted action, including by way of non-limiting example data destruction, covert data collection, browser hijacking, network proxy or redirection, covert tracking, data logging, keylogging, excessive or deliberate barriers to removal, contact harvesting, and unauthorized self-propagation.

Attacker 180 may also want to commit industrial or other espionage against secured enterprise 100, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a client device 110. Buffer overruns may be the result, for example, of poor input validation or use of insecure libraries, and in many cases arise in nonobvious contexts. Thus, although not malicious himself, a developer contributing software to application repository 160 may inadvertently provide attack vectors for attacker 180. Poorly-written applications may also cause inherent problems, such as crashes, data loss, or other undesirable behavior. Because such software may be undesirable itself, it may be beneficial for developers to occasionally provide updates or patches that repair vulnerabilities as they become known. However, from a security perspective, these updates and patches are essentially new versions.

Application repository 160 may represent a Windows or Apple "app store" or update service, a Unix-like repository or ports collection, or other network service providing users 120 the ability to interactively or automatically download and install applications on client devices 110. If application repository 160 has security measures in place that make it difficult for attacker 180 to distribute overtly malicious software, attacker 180 may instead stealthily insert vulnerabilities into apparently-beneficial applications.

In some cases, secured enterprise 100 may provide policy directives that restrict the types of applications that can be installed from application repository 160. Thus, application repository 160 may include software that is not negligently developed and is not malware, but that is nevertheless against policy. For example, some enterprises restrict installation of entertainment software like media players and games. Thus, even a secure media player or game may be unsuitable for an enterprise computer. Security administrator 150 may be responsible for distributing a computing policy consistent with such restrictions and enforcing it on client devices 120.

Secured enterprise 100 may also contract with or subscribe to a security services provider 190, which may provide security services, updates, antivirus definitions, patches, products, and services. McAfee®, Inc. is a non-limiting example of such a security services provider that offers comprehensive security and antivirus solutions. In some cases, security services provider 190 may include a threat intelligence capability such as the global threat intelligence (GTI™) database provided by McAfee Inc. Security services provider 190 may update its threat intelligence database by analyzing new candidate malicious objects as they appear on client networks and characterizing them as malicious or benign. Thus, in some cases, security services provider 190 may include computing devices configured to perform the EXP and BT methods of the present Specification. Specifically, in some cases, computing device 200 (FIG. 2) may be a security appliance provided by or used within security services provider 190.

In another example, secured enterprise 100 may simply be a family, with parents assuming the role of security administrator 150. The parents may wish to protect their children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 150.

Collectively, any object that is or can be designated as belonging to any of the foregoing classes of undesirable objects may be classified as a malicious object. When an unknown object is encountered within secured enterprise 100, it may be initially classified as a "candidate malicious object." This designation may be to ensure that it is not granted full network privileges until the object is further analyzed. Thus, it is a goal of users 120 and security administrator 150 to configure and operate client devices 110 and enterprise network 170 so as to exclude all malicious objects, and to promptly and accurately classify candidate malicious objects.

Figure 2:
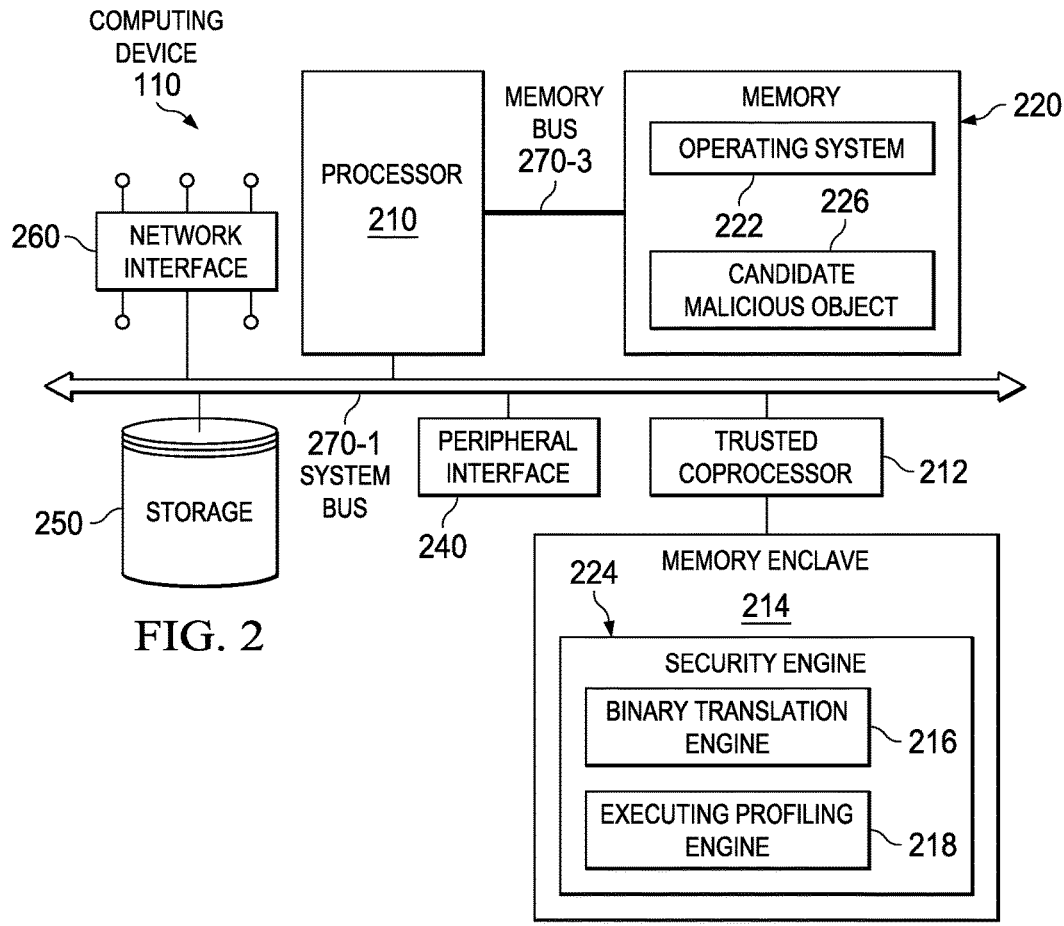
FIG. 2 is a block diagram of a computing device according to one or more examples of the present Specification.

FIG. 2 is a block diagram of computing device 200 according to one or more examples of the present Specification. Computing device 200 may be any suitable computing device. In various embodiments, a "computing device" may be or comprise, by way of non-limiting example, a computer, workstation, embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data.

Computing device 200 may be a client computing device, or in appropriate circumstances may be a security appliance, a server, or any other suitable computing device. As a nonlimiting example, computing device 200 may be placed to receive and analyze new security objects that enter secured enterprise 100 and that do not yet have an established reputation. Thus, when a computing device 200 encounters a new object, software on computing device 200, such as a system management agent, may intercept any attempt to execute the new object. Before the new object is allowed to execute, it is to be profiled by security software. This may be a special security appliance that provides BT engine 216 and execution profiling engine 218. Once the new candidate malicious object is analyzed and classified to an appropriate degree of confidence, it is restricted from executing within secured enterprise 100, allowed to execute only under certain conditions, or allowed to execute without restrictions.

In one example, BT engine 216 is operable for translating a binary object into an instrumentable form, meaning a form that can be instrumented if desired.

In some examples, a first computing device 200 includes a client engine that is operable for uploading candidate malicious objects to a second computing device 200, which may be for example a security appliance operated by security services provider 190 to analyze the candidate malicious object.

Computing device 200 includes a processor 210 connected to a memory 220, having stored therein executable instructions for providing an operating system 222 and at least software portions of a security engine 224. Also within memory 220, a candidate malicious object 226 may be encountered.

Other components of computing device 200 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this Specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this Specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this Specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of security engine 224. Many other configurations are also possible, and are intended to be encompassed within the broad scope of this Specification.

Network interface 260 may be provided to communicatively couple computing device 200 to a wired or wireless network. A "network," as used throughout this Specification, may include any communicative platform operable to exchange data or information within or between computing devices, including by way of non-limiting example, an ad-hoc local network, an Internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

To aid in analyzing candidate malicious object 226, an execution profiling engine 218 and binary translation engine 216 may be provided. These together may usefully analyze and profile candidate malicious object 226.

For additional security and to ensure the integrity of the profiling process, execution profiling engine 218 and binary translation engine 216 may be provided within a trusted execution environment (TEE). A trusted execution environment provides a segregated logical block wherein certain operations can be executed in isolation from the rest of the system. In one example, a TEE includes a trusted co-processor 212 and a memory enclave 214. Memory enclave 214 is a special region of memory that can be accessed only by a trusted co-processor 212, or by processor 210 only via special instructions, such as those provided in the Intel software guard extensions (SGX) instruction set. These ensure that a program may enter or exit enclave 214 only via special TEE instructions. Any attempt to access a memory location with in memory enclave 214 via any other instruction may result in one example in a page fault. Thus, memory enclave 214 is protected from tampering by malware routines, or by unverified software. For ease of reference, EXP 218 and BTE 216 may be referred to collectively as a "security engine" 224.

Security engine 224, in one example, is operable to carry out computer-implemented methods according to this Specification. Security engine 224 may include one or more non-transitory computer-readable mediums having stored thereon executable instructions operable to instruct a processor to provide a security engine. As used throughout this Specification, an "engine" includes any combination of one or more logic elements, of similar or dissimilar species, operable for and configured to perform one or more methods provided by the engine. Thus, security engine 224 may comprise one or more logic elements configured to provide security engine methods as disclosed in this Specification. In some cases, security engine 224 may include a special integrated circuit designed to carry out a method or a part thereof, and may also include software instructions operable to instruct a processor to perform the method. In some cases, security engine 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that security engine 224 may also include other hardware and software, including configuration files, registry entries, and interactive or user-mode software by way of non-limiting example.

In one example, security engine 224 includes executable instructions stored on a non-transitory medium operable to perform a method according to this Specification. At an appropriate time, such as upon booting computing device 200 or upon a command from operating system 222 or a user 120, processor 210 may retrieve a copy of security engine 224 (or software portions thereof) from storage 250 and load it into memory 220. Processor 210 may then iteratively execute the instructions of security engine 224 to provide the desired method.

Peripheral interface 240 may be configured to interface with any auxiliary device that connects to computing device 200 but that is not necessarily a part of the core architecture of computing device 200. A peripheral may be operable to provide extended functionality to computing device 200, and may or may not be wholly dependent on computing device 200. In some cases, a peripheral may be a computing device in its own right. Peripherals may include input and output devices such as displays, terminals, printers, keyboards, mice, modems, network controllers, sensors, transducers, actuators, controllers, data acquisition buses, cameras, microphones, speakers, or external storage by way of non-limiting example.

Figure 3:
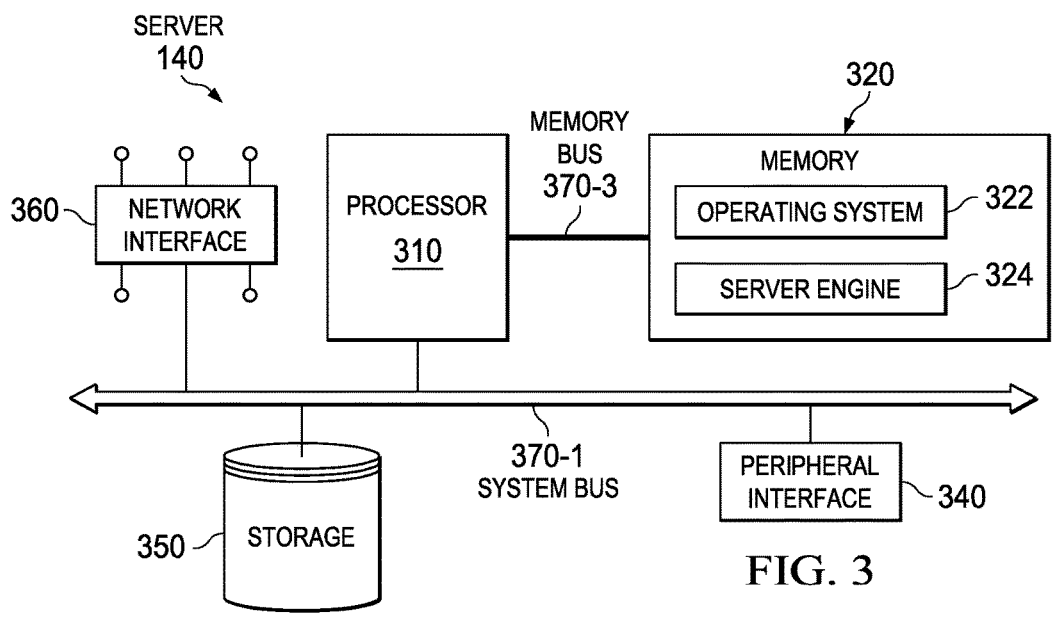
FIG. 3 is a block diagram of a server according to one or more examples of the present Specification.

FIG. 3 is a block diagram of server 140 according to one or more examples of the present Specification. Server 140 may be any suitable computing device, as described in connection with FIG. 2. In general, the definitions and examples of FIG. 2 may be considered as equally applicable to FIG. 3, unless specifically stated otherwise. Server 140 is described herein separately to illustrate that in certain embodiments, logical operations according to this Specification may be divided along a client-server model, wherein client device 110 provides certain localized tasks, while server 140 provides certain other centralized tasks.

Server 140 includes a processor 310 connected to a memory 320, having stored therein executable instructions for providing an operating system 322 and at least software portions of a server engine 324. Other components of server 140 include a storage 350, network interface 360, and peripheral interface 340. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of server engine 324.

Network interface 360 may be provided to communicatively couple server 140 to a wired or wireless network, and may include one or more logic elements as described in FIG. 2.

Server engine 324 is an engine as described in FIG. 2 and, in one example, includes one or more logic elements operable to carry out computer-implemented methods according to this Specification. Software portions of server engine 324 may run as a daemon process.

Server engine 324 may include one or more non-transitory computer-readable mediums having stored thereon executable instructions operable to instruct a processor to provide a security engine. At an appropriate time, such as upon booting server 140 or upon a command from operating system 222 or a user 120 or security administrator 150, processor 310 may retrieve a copy of server engine 324 (or software portions thereof) from storage 350 and load it into memory 320. Processor 310 may then iteratively execute the instructions of server engine 324 to provide the desired method.

Peripheral interface 340 may be configured to interface with any auxiliary device that connects to server 140 but that is not necessarily a part of the core architecture of server 140. A peripheral may be operable to provide extended functionality to server 140, and may or may not be wholly dependent on server 140. Peripherals may include, by way of non-limiting examples, any of the peripherals disclosed in FIG. 2.

Figure 4:
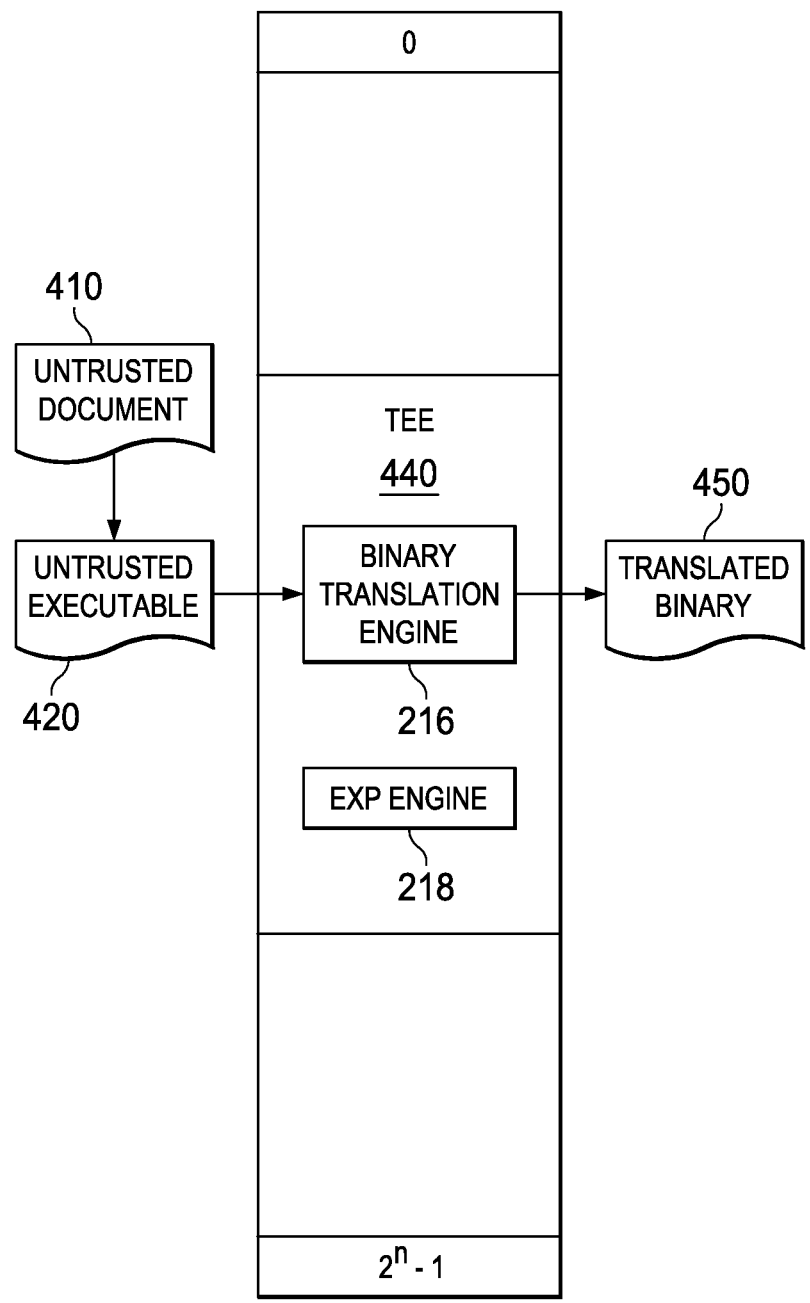
FIG. 4 is a functional block diagram of an execution profiling engine according to one or more examples of the present Specification.

FIG. 4 is a functional block diagram of execution profiling according to one or more examples of the present specification. In the example of FIG. 4, an untrusted document 410

(or any other suitable object) is received into secured enterprise 100, for example by a client device 110. In one illustrative example, trusted document 410 is a portable document format (PDF) document. In one example, untrusted document 410 includes some active content, or content capable of being active when loaded.

Untrusted executable 420 may load untrusted document 410. In this example, untrusted executable 420 may be a userspace PDF reader application, such as Adobe Reader. If untrusted document 410 is a malicious object, it may make assumptions about the memory layout of untrusted executable 420, and may thus attempt to exploit certain vulnerabilities.

However, computing device 200 provides TEE 440 with EXP engine 218 and BTE 216. EXP engine 218 prospectively analyzes untrusted executable 420 opening and reading untrusted document 410. This may include running untrusted executable 420 in a sandbox environment, or binary translation of untrusted executable 420 via BTE 416 to prospectively identify exception conditions. Once an exception condition is identified, it may be traced back to the source instruction, and analyzed to determine whether the instruction is potentially malicious.

In some embodiments, increased analysis of exception conditions is a key differentiator between malware objects and benign objects. Not all exception conditions are the result of malware. Some are simply the result of poor programming, or of encountering unexpected conditions. Thus, not every exception can be treated as a malware attack vector in every case. However, exceptions may useful sign posts for identifying portions of code that warrant deeper scrutiny.

BTE 216 outputs translated binary 450. In some cases, BTE 216 may sign translated binary 415 with an encryption key provided within TEE 440. This allows other enclaves to verify the integrity of translated binary 450, for example via an attestation protocol.

In some cases, BTE 216 may create a translated binary 450 in a new form that excludes potentially malicious operations. Thus, if untrusted executable 420 provides desirable functionality, but also includes some questionable functionality, the useful functionality may be preserved within translated binary 450. In one example, translated binary 450 may be a binary format such as Java byte code, or a proprietary format. Translated binary 450 may be in a format that does not permit the types of low-level memory operations that are available in languages such as C and C++, and that may be exploited by malware authors. Thus, in one example, an enterprise computing policy may require that untrusted executable 420 can only be executed on enterprise client devices 110 in translated binary format 450 until untrusted executable 420 has been thoroughly vetted and is cleared for execution in its native format. This may represent a trade-off decision between the ability to introduce new software into secured enterprise 100 without a cumbersome process that may lock out desirable functionality, while also preserving enterprise security.

Figure 5:
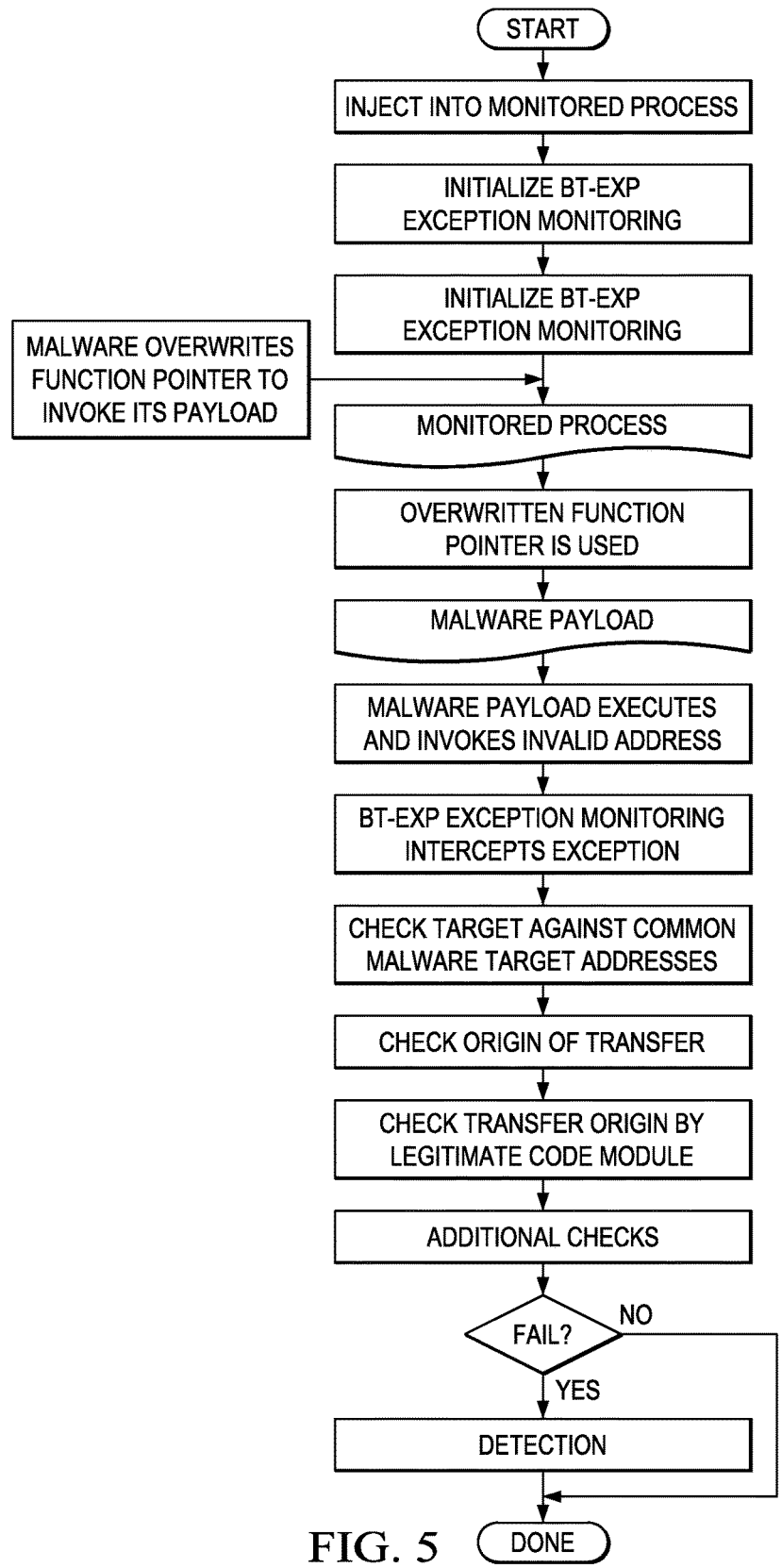
FIG. 5 is a flow chart of a method according to one or more examples of the present Specification.

FIG. 5 is a flow diagram of a method 500 according to one or more examples of the present specification.

In block 502, a process is launched. The process may be, for example candidate malicious object 226 of FIG. 2. If candidate malicious object 226 is an executable file, then this is the process that is monitored. If candidate malicious object 226 is not an executable, or is not a standalone executable (such as a shared object library or a DLL), then the host process that launches or loads candidate malicious object 226 may be monitored. In one example, candidate malicious object 226 is a PDF, and the monitored process is Adobe Reader, which loads the PDF to be analyzed. This example is provided by way of illustration only, and is intended to be nonlimiting.

Still in block 502, analysis components are injected into the monitored process. These will execute within that context for easy access to the monitored process's operations and memory. The analysis components provide EXP engine 218 visibility into the variables used, the memory locations accessed, and the instructions used within candidate malicious object 226.

In block 512, execution profiling engine 218 initializes BT-EXP exception monitoring. In this case, BTE 216 is loaded by the analysis components. This initiates monitoring for execution profiling. With BTE 216 loaded, execution profiling engine 218 is able to selectively monitor execution of instructions within the process of candidate malicious object 226. EXP callbacks for exception monitoring may also be enabled. These may be enabled globally across the entire process, or on a per-thread basis.

In block 514, if candidate malicious object 226 is malware, it may begin executing within the process. In the example where candidate malicious object 226 is a PDF file for example, candidate malicious object 226 may exploit a security flaw to "breakout" of the normal containment area where pdfs are loaded within the process and begin execution of malware code within monitored process 520.

Within monitored process 520, candidate malicious object 226 may make certain assumptions about memory layout, and attempt to transfer to an address based on these assumptions.

In block 524, candidate malicious objects 526 attempts to use an overridden function pointer, for example, based on the assumptions it has made.

In block 530, candidate malicious object 226 attempts to launch malware payload 530.

In block 534, malware payload 530 executes and attempts to invoke an invalid address as described above. If for example, monitored process 520 is a slightly different version of the monitored process (including one that has had a vulnerability patched, or if for whatever reason the assumptions made by candidate malicious object 226 are simply wrong), the attempt to execute the malware may lead to a user mode exception. These may include attempted execution from non-executable memory, attempt to execute from an invalid memory location, invalid instruction forms, and invalid instruction alignment, by way of nonlimiting example.

In block 540, BT-EXP exception monitoring intercepts the exception that is thrown by the invalid attempt. Thus, execution profiling engine 218 may identify the exception condition before the exception occurs, such as through pre-validating instructions and instruction addresses as they execute. This allows a transparent and reliable detection of exception conditions that does not depend upon the post-exception interception of a technique, which may be unreliable in certain embodiments for catching all exception conditions.

Still in block 540, execution profiling engine 218 may invoke a callback function register for handling the intercepted exception.

The exception handling callback function examine the type of exception and the source and destination (if triggered by a controlled transfer instruction), to check the target against common malware target addresses. This may include the operations of blocks 550, 560, 564, and 570.

In block 550, the transfer target addresses are checked against a list of addresses and address ranges commonly used by malware. This is possible because malware code is often taken from common sources, such as, for example, "Metasploit," so that details are commonly reused.

In block 560, the origin of the transfer and the destination are checked for being in writable memory. For example, ROP/JOP gadgets to shell code transition may be from a non-writable memory to a writable page. This is indicative of malware behavior.

In block 564, execution profiling engine 218 may check the transfer origin and the destination for belonging to a legitimate code module such as an operating system library. As an enhancement, if allocation of memory within the process is being tracked, execution profiling engine 218 may examine the allocator of the memory owning the transfer target and source for legitimacy.

In block 570, additional checks may be performed. For example, if the transfer is due to a pointer, then execution profiling engine 218 may check that the target lies within a normally expected range. For example, a return value in a call stack should not normally point to an area within the stack (as a buffer overrun exploit may commonly do). The memory at the return address may also be checked for being writeable (also a symptom of use of a buffer overrun).

In decision block 580, if any of the checks of blocks 550, 560, 564, 570, or any other checks performed fail, then in block 584, candidate malicious object may be detected and classified as malicious or potentially malicious. For some of the checks, the failure by itself will be sufficient to classify candidate malicious object 218 as malicious. For others, additional checks may be necessary, such as by deep inspection software or analysis by a human security analyzer. The human security analyzer maybe any human who is skilled in detecting and identifying malware objects and behavior. In one example, candidate malicious object 218 is marked or tagged for additional analysis, either by deep inspection by a computer, or for human inspection.

Returning to block 580, if none of the checks failed, then candidate malicious object 218 may be at least provisionally classified as benign. In certain embodiments and examples, candidate malicious object 218 may be subjected to additional analysis and scrutiny, such as by antivirus, anti-malware, anti-phishing, or other security engines.

In block 590, the method is done.

Certain functional blocks of method 500 may also be used for address range monitoring. In that case, blocks 502, 510, and 512 may be performed as above. A special register may then be provisioned with BT-EXP callbacks to invoke when specified ranges of memory are transferred to or from. For example, 0x0C0C0C00 through 0x0C0C0CFF may be monitored as described above.

When a callback is triggered, execution profiling engine 218 may analyze the origin or destination of the controlled transfer. It may then validate the code or memory involved to determine whether it is legitimate. Validation methods may include scanning for known byte patterns, such as those known to belong to malware, or validating that the code is backed or owned by a legitimate module, such as a legitimate shared object library or Windows DLL.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

Example Implementations

There is disclosed in an example 1, a computing apparatus, comprising: a memory including a process; and one or more logic elements comprising an execution profiling engine operable for: inspecting at least a portion of the process; determining that the at least a portion of the process produces an exception condition; and designating the process as potentially malicious.

There is disclosed in an example 2, the computing apparatus of example 1, wherein the execution profiling engine is provided at least partly in a trusted execution environment.

There is disclosed in an example 3, the computing apparatus of example 1, wherein the execution profiling engine is further operable for subjecting the process to additional security analysis to identify malicious behavior.

There is disclosed in an example 4, the computing apparatus of example 3, wherein subjecting the process to additional security analysis comprises subjecting the process to computerized deep inspection.

There is disclosed in an example 5, the computing apparatus of example 3, wherein subjecting the process to additional security analysis comprises designating the process for analysis by a human security analyzer.

There is disclosed in an example 6, the computing apparatus of example 1, wherein the execution profiling engine is implemented at least in hardware.

There is disclosed in an example 7, the computing apparatus of example 1, further comprising a binary translation engine operable for translating the process from a first form into a second form.

There is disclosed in an example 8, there is disclosed in a example 8, the computing apparatus of example 7, wherein the second form excludes direct manipulation of memory.

There is disclosed in an example 9, the computing apparatus of example 7, wherein the binary translation engine is provided at least partly in a trusted execution environment.

There is disclosed in an example 10, the computing apparatus of example 7, wherein the binary translation engine is operable for translating the process into an instrumentable form.

There is disclosed in an example 11, the computing apparatus of example 7, wherein at least one of the execution profiling engine and the binary translation engine is at least partly virtualized.

There is disclosed in an example 12, the computing apparatus of example 1, wherein the execution profiling engine is further operable for checking a transfer target addresses against a list of addresses and address ranges commonly used by malware.

There is disclosed in an example 13, the computing apparatus of example 1, wherein the execution profiling engine is further operable for validating that the process is owned by a legitimate software module.

There is disclosed in an example 14, one or more computer-readable mediums having stored thereon instructions that, when executed, instruct a processor for providing an execution profiling engine operable for: inspecting at least a portion of the process; determining that the at least a portion of the process produces an exception condition; and designating the process as potentially malicious.

There is disclosed in an example 15, the one or more computer-readable mediums of example 14, wherein the instructions are further operable for providing the execution profiling engine at least partly in a trusted execution environment.

There is disclosed in an example 16, the one or more computer-readable mediums of example 14, wherein the execution profiling engine is further operable for subjecting the process to additional security analysis to identify malicious behavior.

There is disclosed in an example 17, the one or more computer-readable mediums of example 16, wherein subjecting the process to additional security analysis comprises subjecting the process to computerized deep inspection.

There is disclosed in an example 18, the one or more computer-readable mediums of example 16, wherein subjecting the process to additional security analysis comprises designating the process for analysis by a human security analyzer.

There is disclosed in an example 19, the one or more computer-readable mediums of example 14, wherein the instructions are further for providing a binary translation engine operable for translating the process from a first form into a second form.

There is disclosed in an example 20, the one or more computer-readable mediums of example 19, wherein the second form excludes direct manipulation of memory.

There is disclosed in an example 21, the one or more computer-readable mediums of example 19, wherein the binary translation engine is provided at least partly in a trusted execution environment.

There is disclosed in an example 22, the one or more computer-readable mediums of example 19, wherein the binary translation engine is operable for translating the process into an instrumentable form.

There is disclosed in an example 23, the one or more computer-readable mediums of example 14, wherein the execution profiling engine is further operable for checking a transfer target addresses against a list of addresses and address ranges commonly used by malware.

There is disclosed in an example 24, a computer-implemented method, comprising: inspecting at least a portion of a computational process; determining that the at least a portion of the computational process produces an exception condition; and designating the computational process as potentially malicious.

There is disclosed in an example 25, the method of example 24, further comprising: translating the process from a first form into a second form, wherein the second form is instrumentable.

There is disclosed in an example 26, a method comprising the performing the instructions disclosed in any of examples 14-23.

There is disclosed in example 27, an apparatus comprising means for performing the method of example 26.

There is disclosed in an example 28, the apparatus of example 27, wherein the apparatus comprises a processor and memory.

There is disclosed in an example 29, the apparatus of example 28, wherein the apparatus further comprises a computer-readable medium having stored thereon software instructions for performing the method of example 26.

What is claimed is:

1. A computing apparatus, comprising:
a memory including a locally-executing software process; and
one or more logic elements, including at least a processor, comprising an execution profiling engine configured for:
concurrent with the locally-executing software process, inspecting a segment of the software process;
before executing the segment, determining that the segment will produce an exception condition when the segment runs;
checking transfer target addresses against a list of addresses and address ranges commonly used by malware;
validating that the software process is owned by a legitimate software module;
subjecting the software process to additional security analysis to identify malicious behavior;
designating the software process as potentially malicious; and
taking a security action related to the software process, comprising designating the software process for additional analysis.

2. The computing apparatus of claim 1, wherein the execution profiling engine is provided at least partly in a trusted execution environment.

3. The computing apparatus of claim 1, wherein subjecting the software process to additional security analysis comprises subjecting the software process to computerized deep inspection.

4. The computing apparatus of claim 1, wherein subjecting the software process to additional security analysis comprises designating the software process for analysis by a human security analyzer.

5. The computing apparatus of claim 1, wherein the execution profiling engine is implemented at least partly in hardware.

6. The computing apparatus of claim 1, further comprising a binary translation engine configured for translating the software process from a first form into a second form.

7. The computing apparatus of claim 6, wherein the second form excludes direct manipulation of memory.

8. The computing apparatus of claim 6, wherein the binary translation engine is provided at least partly in a trusted execution environment.

9. The computing apparatus of claim 6, wherein the binary translation engine is configured for translating the software process into an instrumentable form.

10. The computing apparatus of claim 6, wherein at least one of the execution profiling engine and the binary translation engine is at least partly virtualized.

11. One or more tangible, non-transitory computer-readable mediums having stored thereon instructions that, when executed, instruct a processor for providing an execution profiling engine configured for:
inspecting a segment of a concurrent locally-executing software process;
before executing the segment, determining that the segment will produce an exception condition when the segment runs;
checking transfer target addresses against a list of addresses and address ranges commonly used by malware;
validating that the software process is owned by a legitimate software module;

subjecting the software process to additional security analysis to identify malicious behavior;
designating the software process as potentially malicious; and
taking a security action related to the software process, comprising designating the software process for additional analysis.

12. The one or more tangible, non-transitory computer-readable mediums of claim 11, wherein the instructions are further configured for providing the execution profiling engine at least partly in a trusted execution environment.

13. The one or more tangible, non-transitory computer-readable mediums of claim 11, wherein subjecting the software process to additional security analysis comprises subjecting the software process to computerized deep inspection.

14. The one or more tangible, non-transitory computer-readable mediums of claim 11, wherein subjecting the software process to additional security analysis comprises designating the software process for analysis by a human security analyzer.

15. The one or more tangible, non-transitory computer-readable mediums of claim 11, wherein the instructions are further configured for providing a binary translation engine operable for translating the software process from a first form into a second form.

16. The one or more tangible, non-transitory computer-readable mediums of claim 15, wherein the second form excludes direct manipulation of memory.

17. The one or more tangible, non-transitory computer-readable mediums of claim 15, wherein the binary translation engine is provided at least partly in a trusted execution environment.

18. The one or more tangible, non-transitory computer-readable mediums of claim 15, wherein the binary translation engine is configured for translating the software process into an instrumentable form.

19. A computer-implemented method, comprising:
inspecting a segment of a concurrent locally-executing computational process;
before executing the segment, determining that the segment will produce an exception condition when the segment runs;
checking transfer target addresses against a list of addresses and address ranges commonly used by malware;
validating that the computational process is owned by a legitimate software module;
subjecting the computational process to additional security analysis to identify malicious behavior;
designating the computational process as potentially malicious; and
taking a security action related to the computational process, comprising designating the software process for additional analysis.

20. The computer-implemented method of claim 19, further comprising:
translating the computational process from a first form into a second form, wherein the second form is instrumentable.

21. The computer-implemented method of claim 19, further comprising:
subjecting the computational process to additional security analysis, comprising subjecting the computational process to computerized deep inspection.

22. The computer-implemented method of claim 19, further comprising:
subjecting the computational process to additional security analysis, comprising designating the computational process for analysis by a human security analyzer.

23. The computer-implemented method of claim 19, further comprising:
implementing an execution profiling engine at least partly in hardware.

24. The computer-implemented method of claim 20, wherein the second form excludes direct manipulation of memory.

25. The method of claim 20, wherein translating the computational process from a first form into a second form is provided at least partly in a trusted execution environment.

* * * * *